(12) United States Patent
Brusco (10) Patent No.: US 10,081,299 B2
(45) Date of Patent: Sep. 25, 2018

(54) FRONT END SENSOR FOR PEDESTRIANS (71) Applicant: Thunder Power New Energy Vehicle Development Company Limited, Central (HK)

(72) Inventor: Massimiliano Brusco, Milan (IT)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

(21) Appl. No.: 15/466,560

(22) Filed: Mar. 22, 2017

(65) Prior Publication Data

US 2018/0065550 A1 Mar. 8, 2018

Related U.S. Application Data

(60) Provisional application No. 62/384,298, filed on Sep. 7, 2016.

(51) Int. Cl.
*B60Q 5/00* (2006.01)
*B60Q 1/50* (2006.01)
*B60Q 1/44* (2006.01)
*B60Q 1/52* (2006.01)
*B60Q 9/00* (2006.01)

(52) U.S. Cl.
CPC ............ *B60Q 5/006* (2013.01); *B60Q 1/442* (2013.01); *B60Q 1/50* (2013.01); *B60Q 1/525* (2013.01); *B60Q 5/008* (2013.01); *B60Q 9/008* (2013.01)

(58) Field of Classification Search
CPC ................... B60Q 1/525; B60Q 9/008; B60R 2300/8093; B60W 2030/082; B60W 30/09; B60W 2550/10; B60W 30/08; B60W 30/095; G01S 13/931; B60T 2201/024
See application file for complete search history.

(56) References Cited

U.S. PATENT DOCUMENTS 7,291,420 B2 11/2007 Bitsche et al.
7,572,549 B2 8/2009 Wegner
(Continued)

FOREIGN PATENT DOCUMENTS

DE 10 2013 214481 A1 1/2005
EP 2 868 527 A1 5/2015
(Continued)

OTHER PUBLICATIONS

U.S. Appl. No. 15/468,584, filed Mar. 24, 2017, Non-Final Rejection dated May 19, 2017, all pages.
(Continued)

*Primary Examiner* — Mirza Alam
(74) *Attorney, Agent, or Firm* — Kilpatrick Townsend & Stockton LLP (57) ABSTRACT

A vehicle collision warning system includes a first sensor that generates a first signal indicating a traffic condition. The system includes an external warning signal system that emits an external warning signal to warn nearby traffic about a hazard condition. The external warning signal system includes a warning device configured to emit the external warning signal, and a processor. The processor receives the first signal from the first sensor, detects the hazard condition based on the first signal, and generates a control signal to cause the warning device to emit the external warning signal.

14 Claims, 4 Drawing Sheets

(56) References Cited

U.S. PATENT DOCUMENTS

| | | | |
|---|---|---|---|
| 7,951,477 | B2 | 5/2011 | Wood et al. |
| 8,263,250 | B2 | 9/2012 | Hermann |
| 8,863,542 | B2 | 10/2014 | Damsohn et al. |
| 8,871,371 | B2 | 10/2014 | Song |
| 9,151,545 | B2 | 10/2015 | Soukhojak et al. |
| 9,511,730 | B1* | 12/2016 | Wu ................... G08G 1/166 |
| 9,614,263 | B2 | 4/2017 | Yang et al. |
| 2006/0125616 | A1 | 6/2006 | Song |
| 2011/0151315 | A1 | 6/2011 | Masson et al. |
| 2011/0258845 | A1 | 10/2011 | Wells et al. |
| 2014/0015973 | A1* | 1/2014 | Vasquez ............ B60Q 9/008 348/148 |
| 2014/0205893 | A1 | 7/2014 | You et al. |
| 2014/0343750 | A1* | 11/2014 | Minemura ......... B60W 50/04 701/1 |
| 2015/0044519 | A1 | 2/2015 | Rief et al. |
| 2015/0054643 | A1* | 2/2015 | McLoughlin ....... B60Q 1/46 340/472 |
| 2015/0104689 | A1 | 4/2015 | Frias et al. |
| 2015/0314744 | A1* | 11/2015 | Lang ............. B60R 21/0136 340/436 |
| 2016/0167648 | A1 | 6/2016 | James et al. |
| 2017/0001637 | A1* | 1/2017 | Nguyen Van ..... B60W 50/0225 |
| 2017/0101056 | A1* | 4/2017 | Park .................. B60Q 9/008 |

FOREIGN PATENT DOCUMENTS

| | | |
|---|---|---|
| EP | 2 993 083 A1 | 3/2016 |
| FR | 2 958 894 A1 | 10/2011 |

OTHER PUBLICATIONS

U.S. Appl. No. 15/468,622, filed Mar. 24, 2017, Non-Final Rejection dated May 18, 2017, all pages.

U.S. Appl. No. 15/468,799, filed Mar. 24, 2017, Non-Final Rejection dated May 15, 2017, all pages.

U.S. Appl, No. 15/468,696, filed Mar. 24, 2017, Non-Final Rejection dated May 18, 2017, all pages.

Mercedes-Benz: "Active Braking Assist: Driving Assistance package—Mercedes-Benz original", Mar. 10, 2016, XP054977980, Retrieved from the Internet: URL: https://www.youtube.com/watch?v=yW5xeFAlcRA [retrieved on Dec. 22, 2017] 00:00-01:05, 1 page.

European Search Report for EP 17189838 dated Jan. 22, 2018, 11 pages.

* cited by examiner

FRONT END SENSOR FOR PEDESTRIANS

CROSS-REFERENCE TO RELATED APPLICATION

This application is a nonprovisional of and claims priority to U.S. Provisional Application No. 62/384,298, filed Sep. 7, 2016, the entire contents of which are hereby incorporated by reference for all purposes.

FIELD OF THE INVENTION

The disclosure generally relates to a collision warning system for a vehicle.

BACKGROUND OF THE INVENTION

Electric vehicles are growing in popularity as society becomes more and more concerned about carbon emissions and sustainable/renewable energy sources. Electric vehicles operate using electric power stored in one or more batteries. During operation, the stored electrical energy is controllably released to drive an electric motor. The electric motor converts the electrical energy into mechanical energy, which propels the vehicle. Because electric vehicles use an electric motor instead of an internal combustion engine, electric vehicles may be quieter than conventional vehicles. Without noise from the internal combustion engine, neighboring traffic (e.g., pedestrians, animals) may not be aware that an electric vehicle is idling or driving in the area. The minimal noise made by an electric vehicle may be further masked by noisy environments in dense population centers, weather conditions, etc.

SUMMARY OF THE INVENTION

The embodiments discussed below include a collision warning system capable of warning vehicle occupants and nearby traffic of a possible collision situation between an electric vehicle and nearby traffic. The collision warning system enables detection of a hazard condition in a variety of environments using one or more collision sensors. These environments may include dense population centers, low visibility situations, and difficult weather conditions. In some embodiments, the collisions sensors may be complimentary, that is they may enable detection of a hazard condition even when some sensor capabilities are degraded (e.g., low light, bad weather). In order to warn vehicle occupants and/or neighboring traffic of a possible hazard condition, the collision warning system may include an internal warning signal system and/or an external warning signal system. The internal and external warning signal systems include one or more warning devices capable of providing a warning signal to vehicle occupants and nearby traffic. The warning signals may be auditory and/or visual.

DETAILED DESCRIPTION

Figure 1:
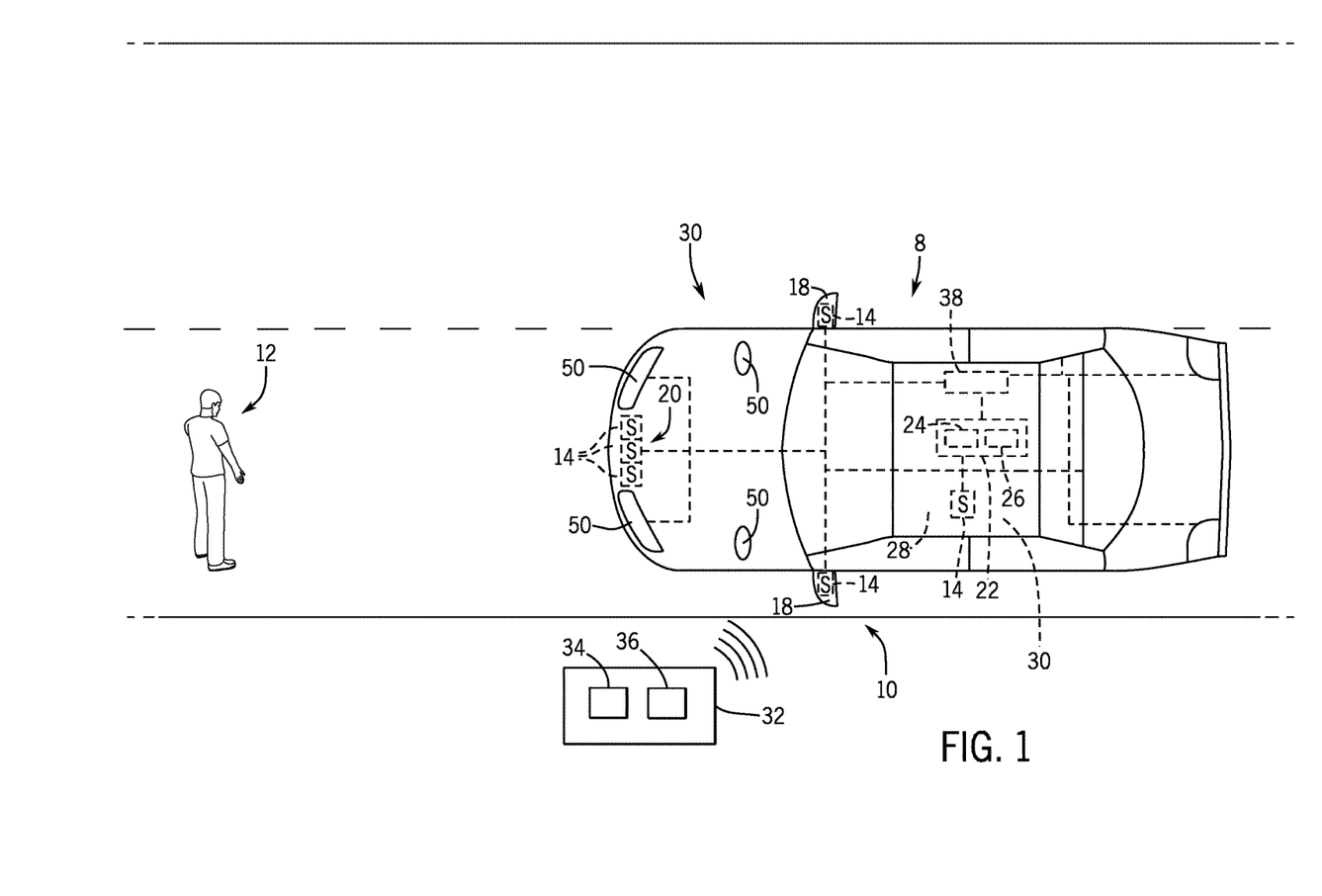
FIG. 1 is a top view of an embodiment of a vehicle with a collision warning system.

FIG. 1 is a top view of an embodiment of an electric vehicle 8 with a collision warning/avoidance system 10. In FIG. 1, the electric vehicle 8 is a car; however, the discussion below may also apply to other electric vehicles 8 (e.g., car, truck, bus, bike, motorcycle, moped, etc.). As will be discussed in greater detail below, the collision warning system 10 warns neighboring traffic about the presence of an electric vehicle 8, which may reduce the risk of a traffic accident.

The collision warning system 10 includes a variety of components that operate together to warn neighboring pedestrians, and/or other vehicles. These components may include one or more collision sensors 14 placed at different locations on the electric vehicle 8. For example, the collision sensors 14 may couple to the front of the electric vehicle 8, on top of the electric vehicle 8, sides of the electric vehicle 8, the side mirrors 18, and/or inside of the vehicle 8 (e.g., dashboard, rearview mirror), etc.

The collision sensors 14 may include optical cameras, infrared cameras, motion detectors, radar, lasers, ultrasonic sensors, and/or any other sensor(s). In some embodiments, the collision warning system 10 may include sensor packages 20 that include one or more collision sensors 14 (e.g., optical cameras, infrared cameras, motion detectors, radar, lasers, ultrasonic sensors, etc.). By including a variety of collision sensors 14, the collision warning system 10 may provide redundant detection of hazards 12 in different environmental conditions. For example, during daylight hours the optical camera may enable hazard 12 detection, but at night or in low light conditions the optical camera may not be able to identify hazards 12. In these situations, another collision sensor 14, such as an infrared camera or radar, may then provide hazard 12 detection. In other words, when the capability of one collision sensor 14 is degraded another collision sensor 14 may still detect hazards 12. Accordingly, the collision warning system 10 may provide continuous or near continuous hazard 12 detection in a variety of conditions such as rain, low light, snow, fog, sand/dust storms, among others.

In operation, the collision sensors 14 transmit signals (e.g., wirelessly, through wired connections) to a controller 22 (e.g., computer). The controller 22 may include one or more processors 24 that execute instructions stored on one or more memories 26 to process the signals (e.g., data) from the collision sensors 14. For example, the controller 22 may receive a signal (e.g., data) from an optical camera. The processor 24 may then execute a program stored on the memory 26 that recognizes objects (e.g., cars, trucks, bicycles, pedestrians, animals, etc.) in images taken by the optical camera. If the processor 24 detects a hazard 12, the processor 24 executes instructions to activate an external warning signal system 28 and/or an internal warning signal system 30. For example, the controller 22 may detect a hazard in less than 0.1, 0.3, 0.5, 1.0, 1.5 seconds, etc.

In some embodiments, the controller 22 may continuously receive feedback from one or more collision sensors 14 enabling the controller 22 to track changes of the potential hazard 12 and determine if the changes alter the hazard condition (e.g., increase the risk of collision, reduce the risk of collision, or remove the risk of collision). These changes may include changes in the speed of the hazard 12; changes in the distance between the hazard 12 and the electric vehicle 8; changes in the direction of travel of the hazard 12; etc. For example, threshold distances, threshold speeds, etc., may be stored in the memory 26 and accessed by the processor 24 to determine whether a hazard condition exists. Furthermore, in some embodiments, the controller 22 may simultaneously receive feedback from multiple collision sensors 14 (e.g., collision sensors 14 with the same or overlapping coverage) enabling the controller 22 to more accurately identify a hazard 12 (e.g., cross-reference, verify) and determine if a hazard condition or situation exists.

In some embodiments, the collision warning system 10 may connect to a remote server 32 that processes the signals from the collision sensors 14. Therefore, instead of including processor(s) 24 on the electric vehicle 8 that are capable of processing the feedback from the collision sensors 14, a remote server 32 with one or more processors 34 may process signals from the collision sensors 14 using instructions (e.g., programs) stored on one or more memories 36. For example, the collision warning system 10 may include a transmitter/receiver 38 that receives signals either directly from the collision sensors 14 or receives the signals through the controller 22. The transmitter/receiver 38 then transmits the sensor signals (e.g., through cellular networks, wireless networks, etc.) to the server 32, which then processes the signals and identifies whether a hazard condition exists. If the server 32 identifies a hazard condition after processing signals from the collision sensors 14, then the server 32 transmits a signal to the controller 22 to activate the external and/or the internal warning signal systems 28, 30. In some embodiments, the controller 22 and the server 32 may redundantly process signals from the collision sensors 14, or the server 32 may only process feedback from the collision sensor 14 if the controller 22 is unable to do so.

In still other embodiments, the controller 22 may activate the external warning signal system 28 in response to detected braking by the vehicle 8. For example, when the driver steps on the brake the controller 22 receives a signal from a sensor that indicates the brake is being depressed and/or sensor that detects a change in the vehicle speed. In response, the controller 22 activates the external warning signal system 28 to let a hazard know about the electric vehicle 8. In some embodiments, the controller 22 may activate the external warning signal system 28 when the brake is depressed if the speed is below a threshold level (e.g., speed limit in a neighborhood, downtown area), while blocking activation of the external warning signal system 28 if the vehicle speed is above the threshold level (e.g., speed limit on a highway). In this way the controller, may activate the external warning signal system 28 to warn an actual hazard (e.g., pedestrians, vehicles), instead of warning drivers on a highway that may be in front of the electric vehicle 8.

In still another embodiments, the controller 22 and/or server 32 may use a combination of braking and collision sensors 14 to activate the external and/or internal warning signal systems 28, 30. For example, even if the controller 22 and/or server 32 detects that the brake is being depressed, the controller 22 and/or server 32 may not activate the external and/or internal warning signal systems 28, 30 unless a hazard is actually detected using the collision sensors 14.

If the external warning signal system 28 is activated, one or more warning devices 50 such as lights, sound devices (e.g., horn, speaker, etc.) may be turned on. In some embodiments, the lights and sound devices may work together to assist neighboring traffic in recognizing the presence/approach of the electric vehicle 8. For example, the sound devices may assist visually impaired individuals, while lights may assist hearing impaired individuals. The combination of lights and sound devices may also help distracted individuals in recognizing the electric vehicle 8. In this way, neighboring traffic is able to recognize a potential risk and to take appropriate action (e.g., not cross the street, move out of the way, stop).

These lights are controlled by the controller 22 with one or more processors 24 using instructions (e.g., programs) stored on one or more memories 26. The lights may include lights that are traditionally on vehicles such as headlights, taillights, brake lights, fog lights, turn signal lights, etc. and/or lights specially included as part of the collision warning system 10. These traditional lights have specific colors such as orange for turn signals and white for headlights. However, if neighboring traffic is detected in the pathway (e.g., tire pathway) of the electric vehicle 8 these lights may emit a different color. For example, the lights may emit a red, blue, green, pink, purple, turquoise color, etc., in order to attract the attention of neighboring traffic. In some embodiments, each light may emit a different color (e.g., each headlight and each signal light emits a different color). In another embodiment, the lights may change colors (e.g., green to yellow, yellow to orange, orange to red, etc.) as the distance between the electric vehicle 8 and the neighboring traffic changes. For example, beyond a first threshold distance the lights may change from white to green, between the first threshold distance and a second threshold distance the lights may change from green to yellow, and between the second threshold distance and a third threshold distance from yellow to red, etc.

In some embodiments, the intensity of the light may increase or decrease (e.g., shade and/or brightness) to warn neighboring traffic (e.g., hazard). The change in intensity may depend on the distance between the electric vehicle 8 and the neighboring traffic. For example, as the distance between the electric vehicle 8 and neighboring traffic decreases the intensity of the light may increase. In some embodiments, the opposite may occur, that is the intensity may decrease. In another embodiment, the light intensity (e.g., brightness and shade) may repeatedly increase and decrease to catch the attention of the neighboring traffic. In a still another embodiment, the lights may flash, change intensity, etc. For example, the lights may flash 1, 2, 3, 4, 5 or more times each second. In another embodiment, some or all of the lights may flash at different intervals, that is one or more lights may flash more rapidly over a time period than one or more other lights. In addition to flashing, the lights in some embodiments may change colors while flashing (e.g., red to orange, orange to red, green to blue, white to some color, etc.). The color change while flashing may be based on distance(s) from the neighboring traffic. For example, beyond a first threshold distance the lights may flash between white to green, between the first threshold distance and a second threshold distance the lights may flash between green to yellow, and between the second threshold distance and a third threshold distance from yellow to red, etc.

As explained above, the warning devices 50 of the collision warning system 10 may emit sound to alert neighboring traffic to the presence of the electric vehicle 8 with or without the lights discussed in this application. For example, sound devices (e.g., horn, speakers) may emit a beeping sound, an audio command (e.g., "move," "caution," "watch out"), a horn blast, a pre-recorded engine noise (e.g., recorded noise from an internal combustion engine, screeching tires), or a combination thereof. In some embodiments, the emitted sound or noise may increase in intensity the closer the electric vehicle 8 is to the neighboring traffic. The increase in intensity may gradually increase and/or increase step wise based on one or more threshold distances between the electric vehicle 8 and the neighboring traffic. In some embodiments, the warning device 50 may change the emitted sound based on one or more distances from the neighboring traffic. For example, beyond a first threshold distance the warning device 50 may emit an engine noise, between the first threshold distance and a second threshold distance the warning device 50 may making make a beeping noise or emit a horn blast, and between the second threshold distance and a third threshold distance emit a warning message (e.g., "move!", "caution!", "watch out!", "electric vehicle moving!").

In some embodiments, one or more of the warning devices 50 may be a display (e.g., heads-up display, monitors, etc.). For example, the display may be inside the electric vehicle 8 or coupled to the exterior of the electric vehicle 8. In operation, the display may provide a written message such as "caution" or "warning," which flashes, scrolls, etc. across the display. In some embodiments, the message may be a symbol such as an arrow, an image of a person and a vehicle colliding, etc. In some embodiments, the display may combine a written message with a symbol/picture. For example, the display may alternatingly present the written message and symbol/picture; simultaneously present the written message and symbol/picture; etc. enabling neighboring traffic to more clearly understand the possible hazard condition.

Figure 2:
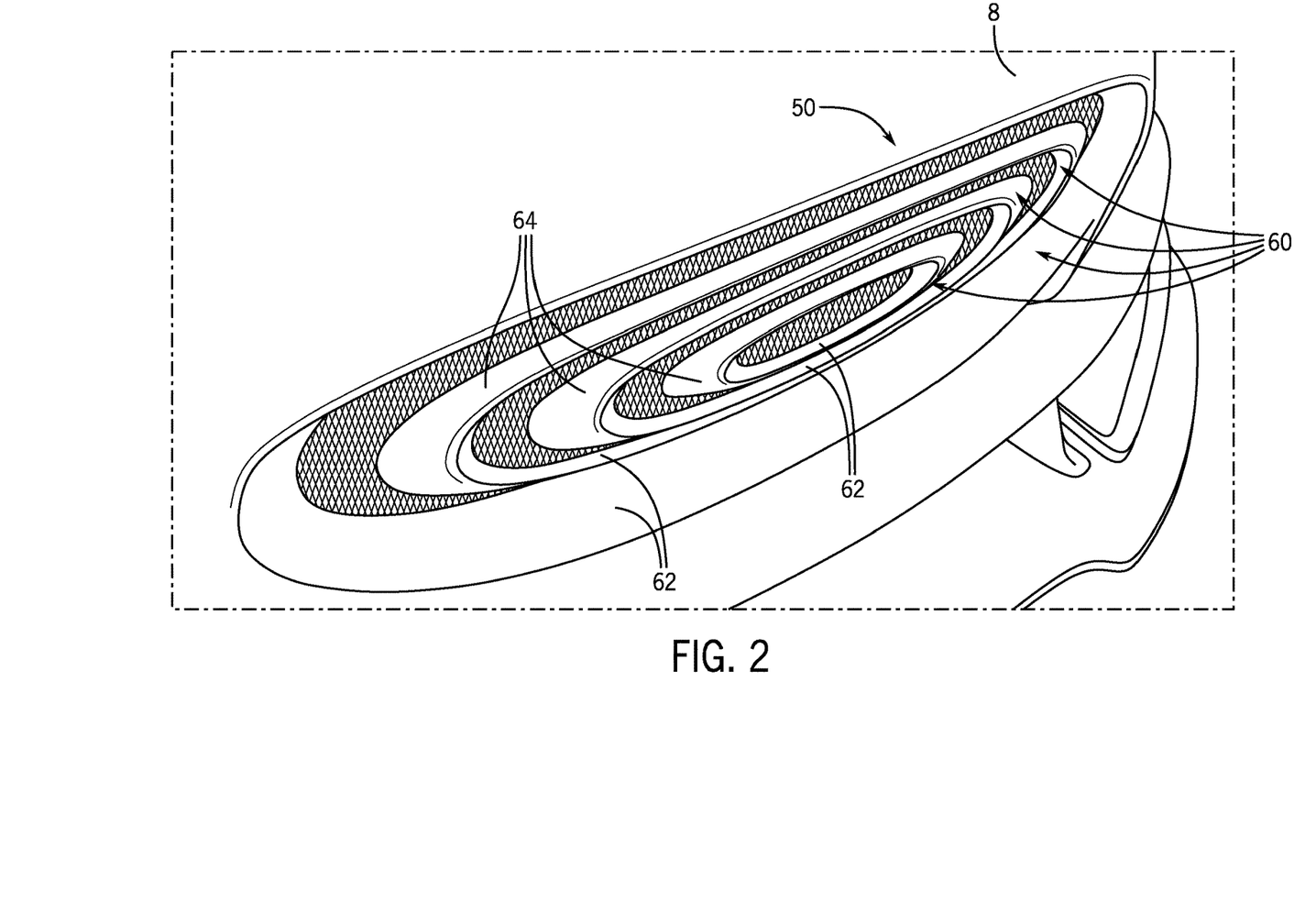
FIG. 2 is a front perspective view of an embodiment of a vehicle with a warning device.
Figure 3:
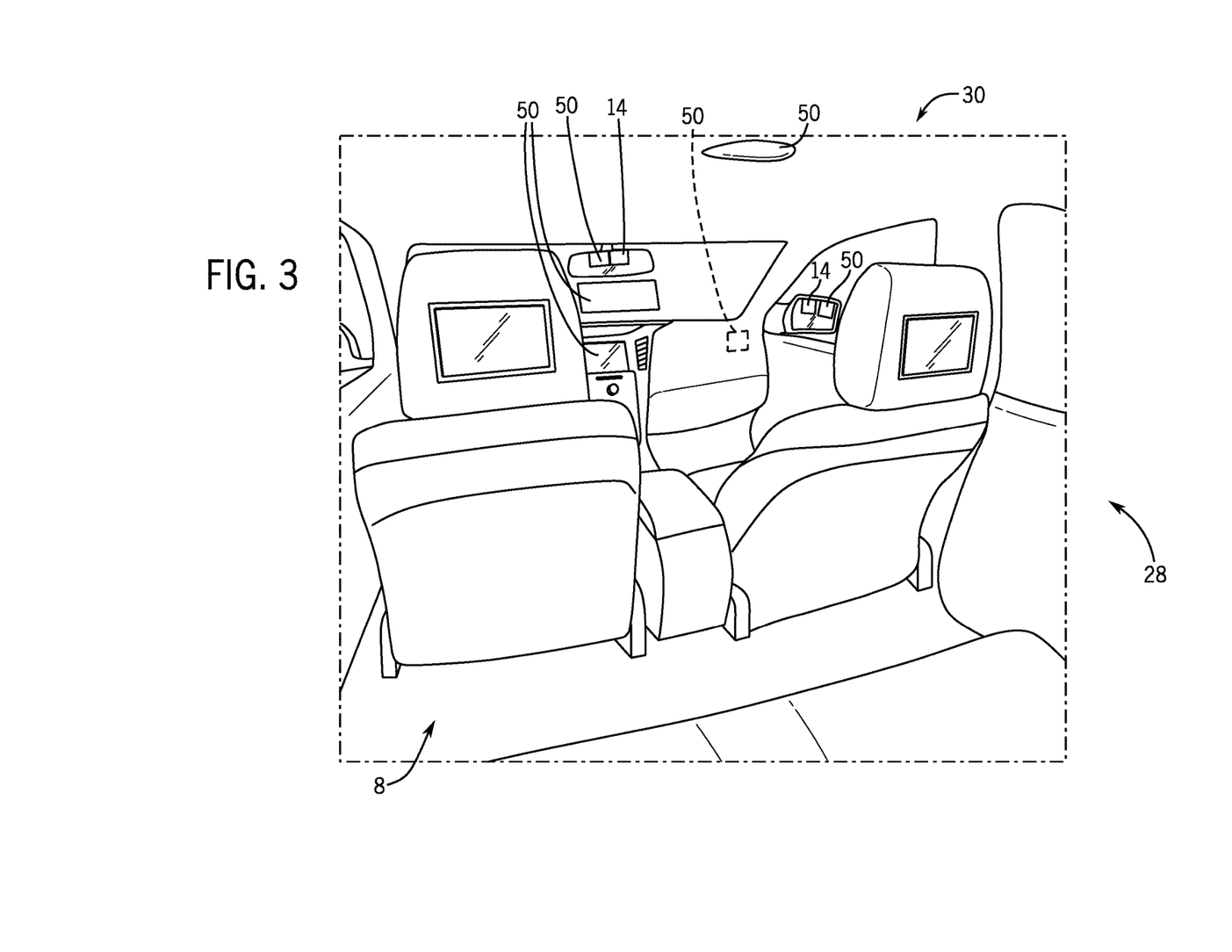
FIG. 3 is an inside view of an embodiment of a vehicle with a collision warning system.

In some embodiments, the lights may have a specific shape that is unique to the vehicle 8 as illustrated in FIG. 2. For example, the lights may be formed into a company logo (e.g., Thunder Power symbol). As illustrated in FIG. 2, the lights may be formed into concentric ovals or circular rings 60. In some embodiments, one or more lights may be positioned on an interior ring surface 62 of the rings 60. In another embodiment, the lights may be positioned on an outer ring surface 64 of the rings 60. And in still other embodiments, the lights may be positioned on both the interior and outer ring surfaces 62, 64 of the rings 60.

In operation, the one or more rings may illuminate when a hazard is detected. In some embodiments, all of the rings 60 may emit the same color. In another embodiment, the lights on the rings 60 may emit different colors (e.g., innermost ring 60 emits red, outermost ring 60 emits blue, interior rings 60 emit green). In still other embodiments, one or more lights on the rings 60 may change their shade and/or intensity (e.g., increase and/or decrease). The number of illuminated rings 60, their colors, intensity, etc. may also change depending on a distance to a potential hazard. For example, the outermost ring 60 may illuminate when the hazard is beyond a first threshold distance. Once the hazard is between the first threshold distance and a second threshold distance one or more additional rings 60 may illuminate. In some embodiments there may be a third threshold distance so that once the hazard is between the second and a third threshold distances all of the rings 60 are illuminated. While three threshold distances are discussed the collision warning system 10 may monitor additional threshold distances. In another embodiment, all of the rings 60 or only subset of the rings 60 may illuminate once a hazard is detected and then all of them may turn off once the hazard has passed. It should be understood that the controller 16 may control the lights in the rings 60 in the same manner as that discussed above with respect to FIG. 1 (e.g., flashing, color changing, changes in intensity, etc.)

FIG. 2 is an inside view of an embodiment of an electric vehicle 8 with a collision warning system 10. As explained above, once a hazard condition is identified the controller 22 may also activate an internal warning signal system 30. The internal warning signal system 30 may include any number of warning devices 50 that communicate in one or more ways with the vehicle occupants (e.g., visual, audio, vibration). For example, one warning device 50 may be a display (e.g., center console display, dashboard display, seat display, heads-up display) within the electric vehicle 8 that provides a warning message. For example, the message may be a written message that flashes, scrolls, etc. on the display. In some embodiments, the message may be a picture that illustrates the electric vehicle 8 and the potential hazard 12 with a symbol (e.g., dot, vehicle symbol, pedestrian symbol). The display may also illustrate the location of the potential hazard 12 with respect to the electric vehicle 8. Moreover, in some embodiments, the controller 22 may be able to identify the type of hazard 12 and then display the specific type of hazard 12 (e.g., pedestrian, vehicle, animal) on the display, thus providing the vehicle occupants with more situational awareness.

In some embodiments, the internal warning signal system 30 may include one or more warning devices 50 that provide an audio warning signal. For example, one or more warning devices 50 may be audio speakers (e.g., display speakers, vehicle speakers, etc.). These audio speakers may provide a brief audio message that warns the vehicle occupants of the potential hazards 12 outside of the electric vehicle 8. The audio message may be a generic warning or a specific warning that gives additional details about the type of hazard 12 (e.g., pedestrian, vehicle, animal, location, etc.).

The internal warning signal system 30 may also include warning device(s) 50 that are lights. For example, the warning device(s) 50 may be cabin lights, reading lights, lights in the rear view mirror, lights in the side mirrors, lights on doors, lights on the car frame, or any combination thereof. These lights may flash, remain completely on, change colors, etc. For example, if the hazard 12 is an vehicle, the controller 22 may slowly flash the lights, while rapidly flashing the lights if the hazard 12 is a pedestrian. In some embodiments, the controller 22 may increase light intensity, increase flashing, and/or change colors, etc. as the hazard 12 approaches, maintains speed, increases in speed, etc. For example, if the hazard 12 is outside of a threshold distance green lights may slowly flash to advise the driver that a hazard 12 is approaching. If the hazard 12 is closer, increases speed, etc. the lights may change from green to yellow flashing lights. If the hazard 12 is close and a collision is imminent or highly likely, the lights may change from yellow to red until the hazard 12 has passed. Likewise, if the hazard condition changes (e.g., the hazard 12 reduces speed, changes direction, etc.) the lights may decrease in intensity, decrease rate of flashing, and/or change colors, etc. In some embodiments, the controller 22 may activate lights in specific locations in the electric vehicle 8 depending on the location of the hazard 12. For example, if the hazard 12 is on a specific side of a electric vehicle 8, lights may be activated only on the side of the electric vehicle 8.

While the above examples of warning devices 50 have been discussed individually some embodiments of the internal warning signal system 30 may combine all or some of the different types of warning devices 50 together. For example, the internal warning signal system 30 may combine warning devices 50 that provide a visual message (e.g., display and/or lights) with a warning device 50 that provides an audio message. In some embodiments, the internal warning signal system 30 may warn vehicle occupants through warning devices 50 that provide vibratory, visual, and auditory signals.

Figure 4:
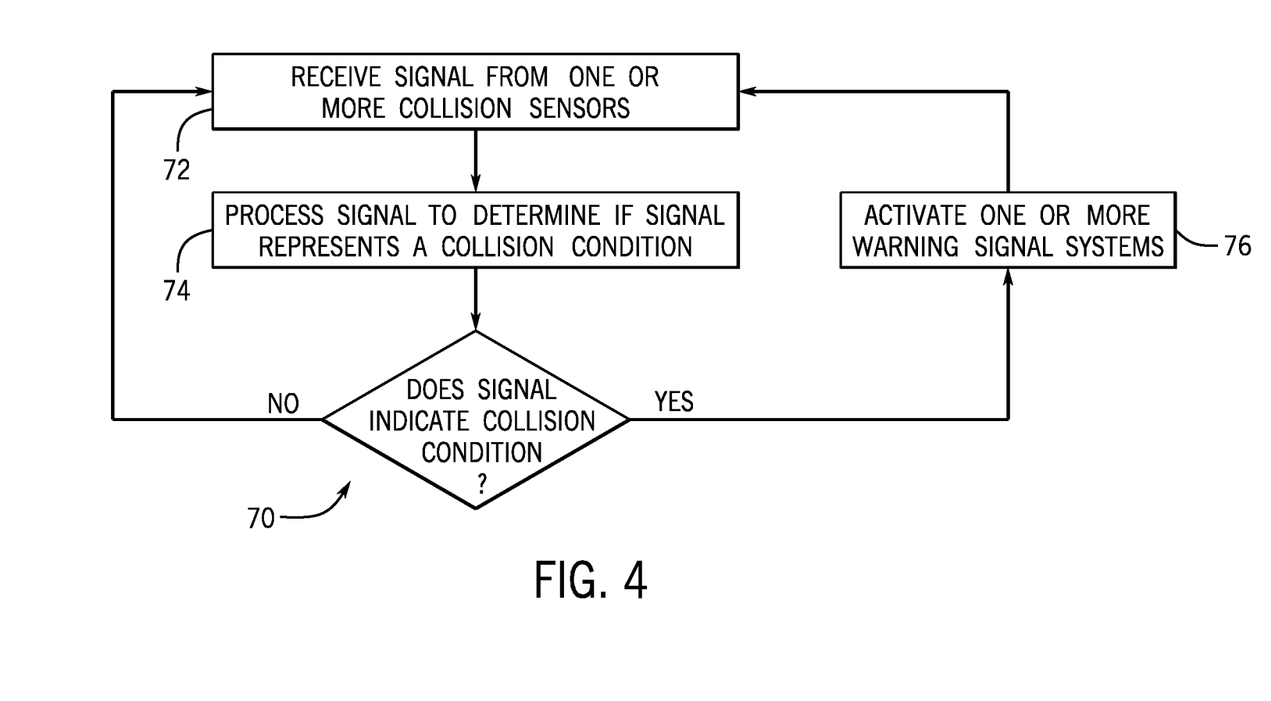
FIG. 4 is a flow chart of an embodiment of a method illustrating operation of the collision warning system.

FIG. 4 is a flow chart 70 of an embodiment of a method of operation of the collision warning system 10. In operation, the collision warning system 10 begins with the controller 22 and/or server 32 receiving signals (e.g., data) from the collision sensors 14 (step 72). As the controller 22 and/or server 32 receives the signals it uses one or more programs stored in the memories 26, 36 to determine if a hazard condition exists (e.g., whether nearby traffic is in or near the tire path of the vehicle) (step 74). If no hazard condition exists the collision sensors 14 may continue to transmit signals from the collision sensors to the controller 22 and/or server 32 for monitoring.

If the controller 22 and/or server 32 detect a hazard condition then the controller 22 activates the collision warning/avoidance system 10 (step 76) (e.g., external and/or internal warning signal systems 28, 30). As explained above, the collision warning/avoidance system 10 may use a variety of warning devices 50 to communicate with the driver and external hazards 12 (e.g., vehicles, pedestrians). As explained above, the warning devices 50 of the collision warning system 10 may communicate using visual signals, auditory signals, or a combination of auditory and visual signals. Once activated, the collision warning/avoidance system 10 may continue operating until the hazard has passed.

Implementations of the embodiments may be made in hardware, firmware, software, or various combinations thereof. The embodiments may also be implemented as instructions stored on a machine-readable medium, which may be read and executed using one or more processing devices. In one implementation, machine-readable media may include various mechanisms for storing and/or transmitting information in a form that can be read by a machine (e.g., a computing device). For example, machine-readable storage media may include read-only memory, random access memory, magnetic disk storage media, optical storage media, flash memory devices, and other media for storing information, and machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A vehicle collision warning system for a vehicle, comprising:
   a first sensor configured to generate a first signal indicating a traffic condition;
   an external warning signal system configured to emit an external warning signal to warn nearby traffic about a hazard condition, the external warning signal system comprising:
   a first warning device configured to emit the external warning signal, wherein the first warning device comprises a plurality of concentric light rings; and
   a processor configured to:
   determine a speed reduction by the vehicle;
   in response to the speed reduction by the vehicle, activate the external warning signal system;
   receive the first signal from the first sensor;
   detect a hazard condition based on the first signal; and
   in response to the detection of the hazard condition, generate a control signal to cause the external warning signal system to emit the external warning signal to warn nearby traffic about the hazard condition; and
   wherein each of the plurality of concentric light rings emits a different color in response to the hazard condition; and
   at least one of the plurality of concentric light rings changes intensity in response to the hazard condition.

2. The system of claim 1, wherein the first sensor is at least one of an optical camera, infrared camera, motion detector, radar, laser, and ultrasonic sensor.

3. The system of claim 1, comprising a second warning device, wherein the second warning device is a display.

4. The system of claim 1, comprising a second warning device, wherein the second warning device is an audio speaker.

5. The system of claim 1, comprising a second sensor configured to generate a second signal indicating the traffic condition.

6. The system of claim 1, wherein the processor is configured to cross-references the first and second signals from the first and second sensors to verify the hazard condition.

7. A method for warning nearby traffic of a hazard condition, comprising:
   determining a speed reduction by a vehicle;
   in response to the speed reduction by the vehicle, activating an external warning signal system of the vehicle;
   receiving a first signal from a first sensor of the vehicle, the first signal indicating a traffic condition nearby the vehicle;
   detecting a hazard condition based on the first signal; and
   generating a control signal to cause the external warning device to emit an external warning signal in response to the detected hazard condition to warn nearby traffic about the hazard condition, wherein the first warning device comprises a plurality of concentric light rings; and,
   wherein each of the plurality of concentric light rings emits a different color in response to the hazard condition; and
   at least one of the plurality of concentric light rings changes intensity in response to the hazard condition.

8. The method of claim 7, wherein the first sensor is at least one of an optical camera, infrared camera, motion detector, radar, laser, and ultrasonic sensor.

9. The method of claim 7, comprising a second warning device, wherein the second warning device is a display.

10. The method of claim 7, comprising a second warning device, wherein the second warning device is an audio speaker.

11. The method of claim 7, comprising receiving a second signal from a second sensor, the second signal indicating the traffic condition.

12. The method of claim 7, comprising cross-referencing the first and second signals from the first and second sensors to verify the hazard condition.

13. The system of claim 1, wherein each of the plurality of concentric light rings emits a same color in response to the hazard condition.

14. The method of claim 7, wherein each of the plurality of concentric light rings emits a same color in response to the hazard condition.

* * * * *